(12) United States Patent
Ritter

(10) Patent No.: US 7,957,722 B2
(45) Date of Patent: Jun. 7, 2011

(54) METHOD AND USER DEVICE FOR REPRODUCING A DATA FILE

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 1239 days.

(21) Appl. No.: 11/285,134

(22) Filed: Nov. 22, 2005

(65) Prior Publication Data
US 2006/0110012 A1  May 25, 2006

(30) Foreign Application Priority Data

Nov. 22, 2004  (EP) ..................................... 04105986

(51) Int. Cl.
*H04M 1/66* (2006.01)
*H04M 1/68* (2006.01)
*H04M 3/16* (2006.01)

(52) U.S. Cl. ............. 455/411; 455/410; 713/186; 726/5

(58) Field of Classification Search .................. 713/200, 713/186; 726/5; 455/410, 411
See application file for complete search history.

(56) References Cited

U.S. PATENT DOCUMENTS

| | | | |
|---|---|---|---|
| 6,256,737 B1 | 7/2001 | Bianco et al. | |
| 7,003,670 B2 * | 2/2006 | Heaven et al. | 713/186 |
| 7,091,826 B2 * | 8/2006 | Hayakawa | 340/5.82 |
| 7,249,177 B1 * | 7/2007 | Miller | 709/225 |
| 7,356,705 B2 * | 4/2008 | Ting | 713/186 |
| 7,809,944 B2 * | 10/2010 | Kawamoto | 713/168 |
| 2002/0130764 A1 * | 9/2002 | Hayakawa | 340/5.82 |
| 2002/0133725 A1 * | 9/2002 | Roy et al. | 713/202 |
| 2002/0174348 A1 * | 11/2002 | Ting | 713/186 |
| 2002/0188854 A1 * | 12/2002 | Heaven et al. | 713/186 |
| 2003/0074558 A1 * | 4/2003 | Riggs | 713/168 |
| 2003/0088781 A1 | 5/2003 | ShamRao | |

FOREIGN PATENT DOCUMENTS

| | | |
|---|---|---|
| WO | 9847096 | 10/1998 |
| WO | WO 01/20538 A2 | 3/2001 |
| WO | 2004/100152 A2 | 11/2004 |

OTHER PUBLICATIONS

Daniel Luders: "Doppelfunker" CT Magazin Fur Computertechnik, Bd. 6, Mar. 10, 2003.
Richard Jahn: "Drahtlos Prasentieren" CT Magazin Fur Computertechnik, Bd. 21, Oct. 6, 2004.

\* cited by examiner

*Primary Examiner* — Patrick N Edouard
*Assistant Examiner* — Liton Miah
(74) *Attorney, Agent, or Firm* — Pearne & Gordon LLP

(57) ABSTRACT

A method and a user device (1) for projecting a data file through a user device (1) are disclosed. The user device (1) has a reproducing device (1.7), means for identifying the user device (1) in a mobile radio network (5), and biometric recording means. The user is authenticated with the transmitted biometric data in a remote server (7) and downloads a data file to be projected or a key for decrypting a data file from the remote server (7) over the mobile radio network (5) in the user device (1). With the reproducing device (1.7) integrated in the user device (1), the data file or presentation is reproduced. The invention also concerns the disclosed user device (1).

24 Claims, 1 Drawing Sheet

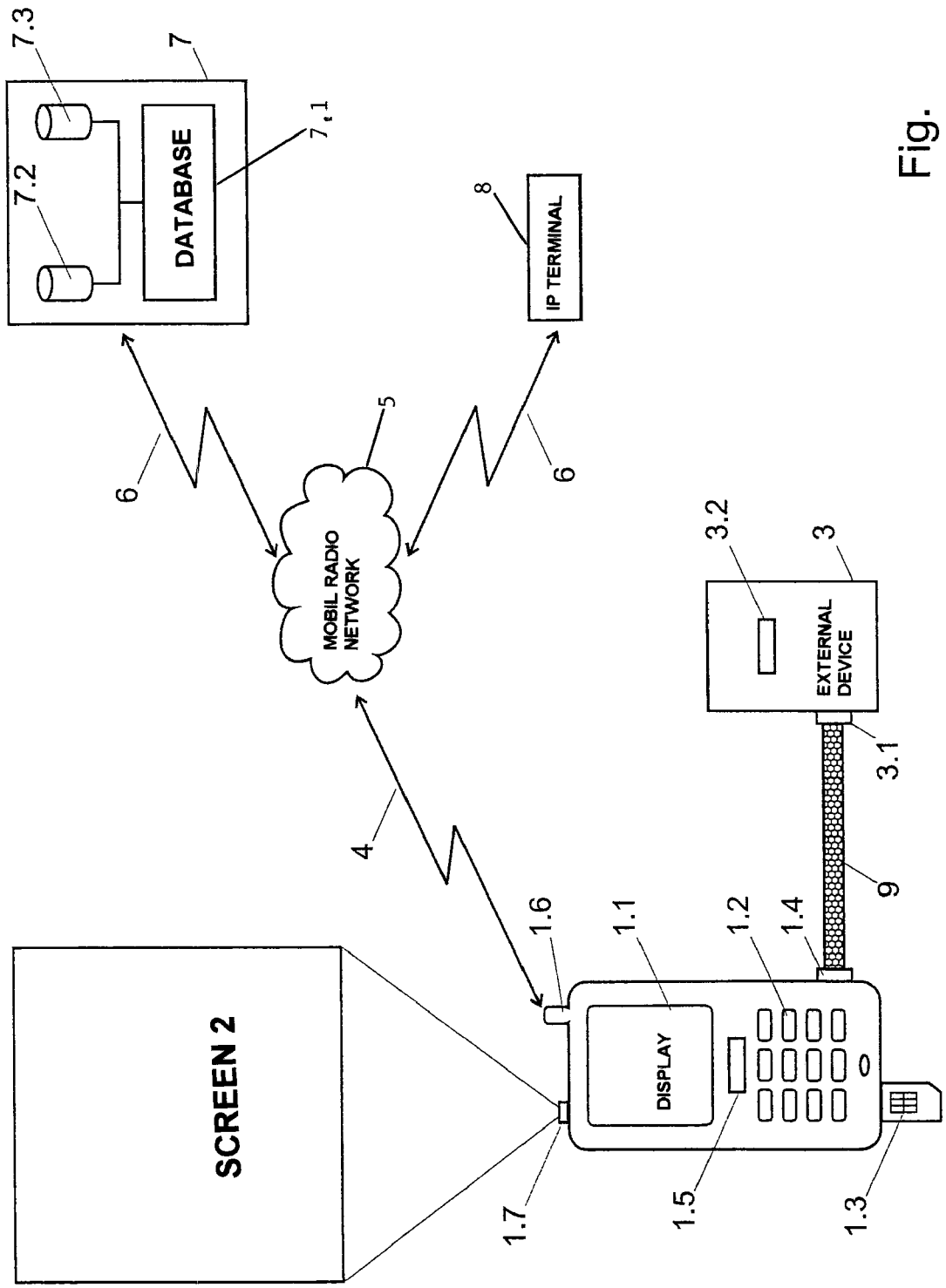

METHOD AND USER DEVICE FOR REPRODUCING A DATA FILE

REFERENCE DATA

The present invention claims priority of European Patent Application 2004EP105986.6 (EP04105986.6) filed on Nov. 22, 2004 in the European Patent Office, the disclosure of which is hereby incorporated by reference.

TECHNICAL FIELD

The invention concerns a method and a user device for reproducing a data file according to the independent claims.

RELATED ART

From the prior art, various devices and methods are known with which data files or other data can be projected. WO-A2-02/05518 for example discloses a mobile telephone with which data received wirelessly can be projected in their original format on an external surface of an external screen. A portable projector for mobile devices is also known from the documents WO-A-03/019287 or EP-A2-1 217 499. Document U.S.-A1-2003/0051139 for example also describes a projector or beamer that is connected over a radio network with a PC. For security purposes, a password is displayed on the screen of the beamer and serves for authenticating the radio network connection between the PC and the projector. U.S. Pat. No. 6,623,127 A1 discloses a similar projector, a PDA or a mobile telephone with which images, news etc. can be represented in enlarged size. This installation is generally intended for people who have difficulties in recognizing small-print messages and characters. Said embodiments however are rather disadvantageous in that they have no particular authentication measures beyond conventional security. Furthermore, it is questionable in which frame the data files to be projected by a far remote server can be realized without jeopardizing security. The data files of US-A1-2003/0051139 for example have to be available on the PC in order to be displayed.

This is why WO-A1-2004/023208 proposes a mobile device with integrated projector in which image data are received and projected by a remote server. However, these embodiments do not mention any special security measures nor any particular data protection. Confidential data in particular cannot be transmitted in this form. Furthermore, no person-related control, though it can by all means be necessary in certain cases, is performed in this document.

REPRESENTATION OF THE INVENTION

It is the task of the present invention to propose a method and a user device with which data files that are downloaded from a remote server can be reproduced or projected without jeopardizing data security. In particular, a person-related identification should be possible.

Another task of the present invention is to no longer have to take along different devices for a presentation.

The task of the invention is solved by a method for reproducing a data file through a user device according to the independent method claim in that
the user device records biometric data of the user,
the user device registers into the mobile radio network,
the user's recorded biometric data or key data derived therefrom are transmitted over the mobile radio network to an authentication server,
the user is authenticated in the authentication server with the transmitted biometric data or the key data derived therefrom,
a data file or a key for opening a data file is downloaded in the user device from a remote server connected with the authentication server and, in case a key has been downloaded to open a data file, a data file is decrypted with this key and
the data file is reproduced with the projector integrated in the user device.

The task according to the invention is also solved by a user device for reproducing a data file according to the independent device claim in that it comprises the following means:
means for recording biometric data or means to connect with such means;
means for registering the user device in a mobile radio network and means for sending and receiving data files over the mobile radio network;
means for reproducing the received data files.

With the inventive method and the inventive user device, a user wishing to make a presentation needs to have his biometric data (or key data derived therefrom) by the user device, the latter connects with the remote server, the user is authenticated in the remote server through the biometric data and the presentation can be downloaded and shown without problem. It is also conceivable for the user to be identified biometrically vis-à-vis the mobile radio network by comparison with biometric data stored in the mobile radio network or in the identification module. A user identification or authentication stored in the mobile device or in the identification module, possibly itself signed with a key, is then sent to the remote server. Provided that such a user device containing the projector/beamer and the person-related identification is available on location at the place of presentation, the user advantageously does not need to take along any paper documents. Provided that the user himself has such a device, he only needs to take it along and can without problem download and show his presentation over an existing mobile radio network. Taking along several devices can advantageously be avoided. It is also possible with the inventive method to present spontaneously data files that are located on the remote server. This could be the case for example if during a discussion questions are raised on a particular topic.

The biometric data are advantageously recorded by a sensor that can be integrated in the user device. It is conceivable that the user device connects over a wireless interface with a haptic module containing the sensor. Such wireless interfaces are generally known in the prior art for example as BlueTooth, DECT, WLAN etc. A wire connection (USB, etc.) with a corresponding haptic module is also conceivable. According to an advantageous embodiment of the inventive method, this sensor records the user's fingerprints. Recording the user's biometric data in this manner is easy and uncomplicated. Other possibilities for recording biometric data (retina scanning, face, language or handwriting recognition, etc.) are also possible in the frame of the present invention. Simultaneously, the user device can be controlled over the sensor. This is for example conceivable in that the user device is remotely controlled over a writing implement (pen, stylus, fountain tip pen, etc.), the sensor being integrated in the writing implement. Use of the user device is thus made user-friendly. Additionally, the user device includes an operating system and an application software (PowerPoint, etc.) that is executed by a processor and that reproduces resp. projects the data file.

It is also conceivable that the user receives from a broadcast network or downloads from a server an encrypted data file that is then decrypted through the key received from the remote server before being reproduced. The downloaded data file can contain images, audio files or video files. According to an advantageous embodiment, each finger can be allocated a particular data file. This allows the correct data file from being found automatically and not having to be sought.

The data file to be projected can be additionally protected for security reasons. With Digital Right Management (DRM), access to a data file can be linked with the biometric data of the user, i.e. the reproduction, the billing of the reproduction, the self-destruction of the file depending on the time and/or place can be made to depend thereupon. In addition to this biometric authentication, entering a password may be required at one or several of said places (VPN gateway, authentication or remote server or data file itself).

The device can be a mobile telephone that is provided with said projector and the biometric identification means. In another embodiment a computer, portable computer or beamer is provided with an additional PC card in order to connect with the mobile radio network; the biometric identification means can be part of the computer or they can on the other hand be connected with the device over a wireless interface.

SHORT DESCRIPTION OF THE FIGURES

The invention will be described in more detail on the basis of the single FIGURE showing a telecommunication system with which the inventive method for projecting a data file can be performed. Only the elements needed for understanding the invention are represented.

WAYS FOR EXECUTING THE INVENTION

The single FIGURE shows a telecommunication system with which the inventive method for projecting a data file can be performed. A user device 1 with a display 1.1 and a keyboard 1.2 is provided with an identification module 1.3 in order to identify itself over an antenna 1.6 in a mobile radio network 5 and to connect therewith. Additionally, the user device 1 is provided with a reproducing device 1.7 and a sensor 1.5 or other recording means for recording biometric data of the user. Said mobile radio network 5 is a conventional network such as GSM, GPRS, UMTS or WLAN. It could however also be another suitable mobile radio network 5 that fulfils the same functions, such as for example UMA (unlicensed mobile access).

According to the inventive method, the user device 1 first records the biometric data of the user. As shown in the single FIGURE, this can occur through the sensor 1.5 that is integrated in the user device 1. In the second embodiment of the inventive method, the user device 1 connects with an external device 3 over a wireless interface 1.4 working with a contactless transmission 9 at close range. Such a haptic module is also provided with an interface 3.1 working at close range and with a sensor 3.2 or other recording means for recording biometric data of the user. Such interfaces 1.4, 3.1 are generally known in the prior art for example as BlueTooth, DECT, ZigBee or WLAN. In a further embodiment, the device is connected over a wire connection (USB, etc.) with a corresponding haptic module. According to an advantageous embodiment of the inventive method, the sensor 1.5, 3.2 records the fingerprints of the user. A sensor for recording a fingerprint and suitable for being used in the sense of the present invention, is known for example from document WO-A2-2003/007218. Other sensors that fulfill the same function are however suitable in similar fashion for the present invention. Other examples for recording biometric data that are suitable for being used for the present invention are the scanning of the eye's retina (in particular in connection with a Virtual Retinal Display for reproducing the data file) or face, handwriting or voice recognition.

In a second step, the user device 1 registers in the mobile radio network 5. This occurs through the identification module 1.3 (for example a SIM card) of the user device 1. The user now wishes to download from a remote server 7, which can be reached over a VPN gateway or another IP terminal 8, a data file to be projected. The remote server 7 and the IP terminal 8 can for example be part of a company-internal or private LAN or part of another private network. The recorded biometric data or key data derived therefrom are then transferred over a connection 4, the mobile radio network 5 and a connection 6 to the remote server 7 or to the IP terminal 8. Within a remote server 7, depending on the embodiment and user preferences, different databases 7.1, customer data 7.2, other object data 7.3 etc. are available.

In a first step, the user is identified with the calling number (CLI Caller-Line-Identification) or with other data stored in the identification card 1.3 of the user device 1 or in a register of the mobile radio network operator. With the transmitted biometric data or key data, the user is authenticated in the next step in an authentication server. This can be part of a Firewall, of said VPN gateway, in the server itself or part of the data. In addition to this biometric authentication, entering a password may be required at one or several of said places. The data file to be projected can additionally be protected by password or otherwise. It is also conceivable for the user to be identified biometrically vis-à-vis the mobile radio network by comparison with biometric data stored in the mobile radio network or in the identification module. A user identification or authentication, that itself can be signed with a key, is then sent to the remote server. According to an advantageous embodiment, each finger can be allocated a particular data file. This allows the correct data file from being found automatically and not having to be first sought. With the correct finger, it is possible, after authentication, to also have a "direct access" to a certain data file. This manner allows a secure, fast access to a data file, for example in stress situations, without having to think long as to which data file to choose. With Digital Right Management (DRM), access to a data file can be linked with the biometric data of the user, i.e. the reproduction, the billing of the reproduction, the self-destruction of the file depending on the time and/or place can be made to depend thereupon. The downloading of a data file can be billed accordingly by a provider (prepaid, postpaid, debit from a user account, etc.).

As soon as the authentication and, if necessary, the further security queries (password request, DRM rights, etc.) have been completed, a data file or other data, videos, audio files, presentations etc. to be projected are downloaded from the remote server 7 into the user device 1 over a data channel of the mobile radio network 5. In another embodiment, it is not the data file itself that is downloaded from the remote server 7 but merely a key that serves for decrypting a data file. The data file itself is then downloaded from the remote server 7 or from another server connected with the mobile radio network. It is also conceivable that the user receives an encrypted data file from a broadcast network. A data file thus received or downloaded is decrypted in a second step with the key downloaded from the remote server 7. The data file is projected resp. reproduced with the reproducing device 1.7 integrated in the user device 1. The reproducing of a data file can also refer to the reproducing of a stream (for example TV over UMTS).

The user device 1 has its own operating system and an application software that is executed by a processor to project the data file onto the external screen 2. The software can be for example PowerPoint but other data reproduction programs for the same purpose can be conceivable. The in-built projector is a mini or micro projector known from the prior art, a Virtual Retinal Display (VRD) that projects the data directly onto the eye's retina, or a laser projector (MEMS projector). Several connected VRDs or several other devices for private or public use can also be used. Thus, a television program can be downloaded for the whole family whilst the family is sitting in front of the screen 2 or each family member has his own reproducing device, his own Virtual Retinal Display in the form of spectacles, etc. The data file to be projected can be downloaded in the user device and stored there. For this purpose, the user device 1 additionally has sufficient memory space for the received data file. It can also reproduce the data file without permanent storing directly with said projector (e.g. in streaming mode).

The user device 1 can be operated over said keyboard 1.2 or a connected mouse. In an advantageous embodiment of the invention, the cursor of the user device 1 and the reproducing device 1.7 can be controlled over the biometric recording means resp. the sensor 1.5, 3.2, with which all known functions such as movements, rotation and click can be performed. In this manner, use of the user device 1 can be made relatively simple. It is also conceivable that the user device 1 and the integrated reproducing device 1.7 can be remotely controlled over a writing implement (pen, stylus, fountain head pen, etc.), in which the sensor 1.5, 3.2 is integrated (not represented in the single FIGURE). It is thus possible in this way to make use of the user device user-friendly.

Said user device 1 can, as shown in the single FIGURE, be a mobile device or a mobile telephone having an integrated reproducing device 1.7, an identification module 1.3 for identifying the user device 1 in the mobile radio network 5 and having also biometric recording means or being connected with such biometric recording means over a wireless interface 1.4. The data for registering into the mobile radio network 5 are then stored in a SIM card as identification module 1.3 in the user device 1. The user device 1 can be a computer, portable computer or a beamer or projector that is additionally provided with a PC card in order to connect it with the mobile radio network 5. In computers already available today, capacitive haptic sensors are already integrated that serve to control the cursor resp. the computer (X- and Y-movement, rotation, pressure as click function) and that simultaneously record the fingerprints of the user. The biometric identification means in the form of a haptic module can however also be connected over said wireless interface 1.4 with the computer, the portable computer or the beamer, as described here above. Such interfaces are normally integrated as a standard in these devices.

The present invention also concerns a user device 1 for projecting data files, having an integrated reproducing device 1.7, an identification module 1.3 for identifying the user device 1 in a mobile radio network 5 and having also biometric recording means or capable of being connected with such biometric recording means over a wireless interface 1.4. As already explained the user device 1 includes a processor, an operating system and an application software such as for example PowerPoint etc. for reproducing the data files. In an integrated memory, the data files can if needed be temporarily stored before being reproduced.

A user wishing to make a presentation advantageously has his biometric data recorded by the user device 1, the latter connects with the remote server 7, the user is authenticated in the remote server 7 through the biometric data and the presentation can be downloaded and shown without problem. Provided that such a user device 1 containing the reproducing device 1.7/beamer and the person-related identification is available on location at the place of presentation, the user advantageously does not need to take along any paper documents. Provided that the user himself has such a device, he only needs to take it along and can without problem download and show his presentation over an existing mobile radio network 5. Taking along several devices (beamer, laptop, etc.) can advantageously be avoided. It is also possible with the inventive method to present spontaneously data files that are located on the remote server. This could be the case for example if during a discussion questions are raised on a particular topic.

REFERENCE LIST

1 User device
1.1 Display
1.2 Keyboard
1.3 Identification module
1.4 Wireless interface
1.5 Sensor for recording a fingerprint
1.6 Antenna
1.7 Reproducing device
2 Screen
3 External device
3.1 Wireless interface
3.2 Sensor for recording a fingerprint
4 Connection over the mobile radio network 5
5 Mobile radio network
6 Connection over the mobile radio network 5
7 Remote server
7.1 Database
7.2 Customer data
7.3 Object data
8 IP terminal
9 Wireless transmission

The invention claimed is:

1. Method for reproducing a data file through a mobile user device, the mobile user device having an integrated reproducing device, an identification module for identifying the user device in a mobile radio network and having also biometric recording means or being connected with such biometric recording means over a wireless interface, wherein the method includes the following method steps:

the mobile user device recording biometric data of the user using said biometric recording means, the mobile user device registering into the mobile radio network, the mobile user device transmitting the user's recorded biometric data or key data derived therefrom over the mobile radio network to an authentication server, authenticating the user in the authentication server using the transmitted biometric data or the key data derived therefrom, in response to said authenticating, transmitting the data file or a key for opening the data file to the mobile user device over the mobile radio network from a remote server connected with the authentication server, in case a key has been downloaded to open the data file which has been previously encrypted, the data file is decrypted with this key, and reproducing a video or presentation, utilizing the data file, for viewing by the user with the reproducing device integrated in the mobile user device, wherein said video or presentation cannot be viewed on the mobile user device without authenticating the user.

2. The method of claim 1, wherein the biometric recording means are in the form of a sensor that records the user's fingerprints.

3. The method of claim 1, wherein the user device records itself the biometric data of the user.

4. The method of claim 1, wherein the user device is connected over an interface at close range with an external device to record the biometric data of the user in the external device.

5. The method of claim 4, wherein the user device and the integrated reproducing device are remotely controlled over a writing implement in which the sensor or the biometric recording means are integrated.

6. The method of claim 1, wherein a cursor of the user device is controlled over a keyboard of the user device or the biometric recording means.

7. The method of claim 1, wherein the user device is connected over the mobile radio network with a remote server that is part of a LAN or of another private network and in that the other data file or the key for opening the data file is downloaded from this remote server.

8. The method of claim 1, wherein the biometric data are used to ensure DRM rights connected with said data file.

9. The method of claim 1, wherein the data file opened with a downloaded key is downloaded from the remote server or from another server, or is received through a broadcast network.

10. The method of claim 1, wherein the access to one or several of the following elements: an existing Firewall, a VPN gateway, the authentication or remote server, or the data file itself, is additionally protected by a password.

11. The method of claim 1, wherein the data file is downloaded in the user device and stored there.

12. The method of claim 1, wherein the data file is downloaded in the user device and directly projected to a user with said reproducing device without permanent storing.

13. The method of claim 1, wherein the data file is projected to a user by means of an application software that is executed in the user device by a processor.

14. The method of claim 1, wherein the data file is projected to a user using one or several Virtual Retinal Display (VRD) or a laser projector.

15. The method of claim 1, wherein the data file is projected to a user with a beamer as integrated projector against an external screen.

16. The method of claim 1, wherein the user device is a mobile device and the data for registering into the mobile radio network are stored in an identification card in the user device.

17. The method of claim 1, wherein the user device is provided with a PC card for connecting it with the mobile radio network.

18. The method of claim 1, wherein the data file or the key for opening the data file is transmitted over a known mobile radio network such as GSM, GPRS, UMTS, WLAN.

19. Method for reproducing a data file through a mobile user device, the mobile user device having an integrated reproducing device, an identification module for identifying the mobile user device in a mobile radio network and having also biometric recording means or being connected with such biometric recording means over a wireless interface, wherein the method includes the following method steps:

the mobile user device recording biometric data of the user using said biometric recording means, the mobile user device registering into the mobile radio network, the mobile user device transmitting the user's recorded biometric data or key data derived therefrom over the mobile radio network to an authentication server, authenticating the user in the authentication server using the transmitted biometric data or the key data derived therefrom, in response to the user being authenticated, downloading the data file or a key for opening the data file to the mobile user device over the mobile radio network from a remote server connected with the authentication server, in case a key has been downloaded to open the data file, decrypting the data file with the key, and reproducing a video or presentation, utilizing the data file, for viewing by the user with the reproducing device integrated in the mobile user device, wherein the mobile user device is connected over the mobile radio network with a remote server that is part of a LAN or another private network, and wherein the data file or the key for opening the data file is downloaded from this remote server, wherein said video or presentation cannot be viewed on the mobile user device without authenticating the user.

20. Method for reproducing a data file through a mobile user device, the mobile user device having an integrated reproducing device, an identification module for identifying the user device in a mobile radio network and having also biometric recording means or being connected with such biometric recording means over a wireless interface, wherein the method includes the following method steps:

providing the data file in the mobile user device, wherein the data file is encrypted, the mobile user device recording biometric data of the user using said biometric recording means, the mobile user device registering into the mobile radio network, the mobile user device transmitting the user's recorded biometric data or key data derived therefrom over the mobile radio network to an authentication server, authenticating the user in the authentication server using the transmitted biometric data or the key data derived therefrom, in response to said authenticating, downloading a key for opening the data file to the mobile user device over the mobile radio network from a remote server connected with the authentication server, decrypting the data file with the key, and after said decrypting, reproducing the data file with the reproducing device integrated in the mobile user device.

21. Method for reproducing a data file through a mobile user device, the mobile user device having an integrated reproducing device, an identification module for identifying the mobile user device in a mobile radio network and having also biometric recording means or being connected with such biometric recording means over a wireless interface, wherein the method includes the following method steps:

the mobile user device recording biometric data of the user using said biometric recording means, the mobile user device registering into the mobile radio network, the mobile user device transmitting the user's recorded biometric data or key data derived therefrom over the mobile radio network to an authentication server, authenticating the user in the authentication server using the transmitted biometric data or the key data derived therefrom, downloading the data file or a key for opening the data file to the user device over the mobile radio network from a remote server connected with the authentication server, in case a key has been downloaded to open the data file, decrypting the data file with the key, and reproducing the data file with the reproducing device integrated in the mobile user device for an authenticated user, wherein the data file is reproduced without permanent storage in a streaming mode with the reproducing device being integrated with the user device.

22. Method for reproducing a data file through a mobile user device, the mobile user device having an integrated reproducing device, an identification module for identifying the mobile user device in a mobile radio network and having also biometric recording means or being connected with such biometric recording means over a wireless interface, wherein the method includes the following method steps:

the mobile user device using the biometric recording means for recording fingerprint data of a plurality of user fingers as biometric data of the user, the mobile user device registering into the mobile radio network, transmitting the user's recorded biometric data or key data derived therefrom over the mobile radio network to an authentication server, authenticating the user in the authentication server using the transmitted biometric data or the key data derived therefrom, downloading the data file or a key for opening the data file to the mobile user device over the mobile radio network from a remote server connected with the authentication server, and in case a key has been downloaded to open the data file, decrypting the data file using the key, wherein biometric data of each one of said plurality of fingers is allocated to a particular data file.

23. The method of claim 1, wherein said reproducing is accomplished by projecting an image provided by the data file for viewing by the user.

24. Method for reproducing a data file through a mobile user device, the mobile user device having an integrated reproducing device, an identification module for identifying the user device in a mobile radio network and having also biometric recording means or being connected with such biometric recording means over a wireless interface, wherein the method includes the following method steps:

the mobile user device recording biometric data of the user using said biometric recording means, the mobile user device registering into the mobile radio network, the mobile user device transmitting the user's recorded biometric data or key data derived therefrom over the mobile radio network to an authentication server, authenticating the user in the authentication server using the transmitted biometric data or the key data derived therefrom, in response to said authenticating, transmitting the data file or a key for opening the data file to the mobile user device over the mobile radio network from a remote server connected with the authentication server, in case a key has been downloaded to open the data file which has been previously encrypted, the data file is decrypted with this key, and reproducing the data file for viewing by the user with the reproducing device integrated in the mobile user device, wherein the data file is projected to a user using one or several Virtual Retinal Display (VRD) or a laser projector.

* * * * *